(12) United States Patent
Wang

(10) Patent No.: US 12,022,923 B2
(45) Date of Patent: Jul. 2, 2024

(54) NFC ORNAMENT

(71) Applicant: Beijing XinYouLingXi Technology Co., Ltd, Beijing (CN)

(72) Inventor: Jieming Wang, Beijing (CN)

(73) Assignee: Beijing XinYouLingXi Technology Co., Ltd

(*) Notice: Subject to any disclaimer, the term of this patent is extended or adjusted under 35 U.S.C. 154(b) by 0 days.

(21) Appl. No.: 18/127,065

(22) Filed: Mar. 28, 2023

(65) Prior Publication Data

US 2023/0231312 A1 Jul. 20, 2023

(30) Foreign Application Priority Data

Nov. 28, 2022 (CN) .......................... 202223186890.9

(51) Int. Cl.
| | |
|---|---|
| A44C 9/00 | (2006.01) |
| G06K 19/077 | (2006.01) |
| H01Q 1/27 | (2006.01) |
| H01Q 1/44 | (2006.01) |
| H04B 5/26 | (2024.01) |

(52) U.S. Cl.
CPC ...... *A44C 9/0053* (2013.01); *G06K 19/07762* (2013.01); *G06K 19/07771* (2013.01); *G06K 19/07779* (2013.01); *H01Q 1/273* (2013.01); *H01Q 1/44* (2013.01); *H04B 5/26* (2024.01)

(58) Field of Classification Search
CPC ........ H01Q 1/44; H01Q 1/273; A44C 9/0053; G06Q 20/321; G06K 19/00762
See application file for complete search history.

(56) References Cited

U.S. PATENT DOCUMENTS

| | | | |
|---|---|---|---|
| 10,681,818 B1 * | 6/2020 | Graber | H05K 1/189 |
| 10,855,335 B1 * | 12/2020 | Napoles | H01Q 21/065 |
| 2007/0104897 A1 | 5/2007 | Oba et al. | |
| 2008/0053362 A1 | 3/2008 | Somers et al. | |

(Continued)

FOREIGN PATENT DOCUMENTS

| | | | |
|---|---|---|---|
| CN | 203167170 U | * | 8/2013 |
| CN | 203840337 U | * | 9/2014 |

(Continued)

OTHER PUBLICATIONS

Totwoo; totwoo Smart NFC Ring—Stylish Digital Business Card l925 Sterling Silver Black Agate/Malachite Gemstone Ring Gift for Women | Instantly Share Contact Info, Social Media for iPhone and Android—Tap to Share; Jun. 9, 2023; Amazon.com (Year: 2023).*

(Continued)

*Primary Examiner* — AB Salam Alkassim, Jr.
(74) *Attorney, Agent, or Firm* — Jose Cherson Weissbrot

(57) ABSTRACT

The present disclosure relates to a near-field communication (NFC) ornament, including an ornament main body, an NFC chip, an NFC antenna, an NFC antenna housing and a decorating part; a surface of the ornament main body is provided with an insert hole and a supporting face located at a periphery of the insert opening; a groove is formed in the NFC antenna housing; an apertural face of the NFC antenna housing is connected with a supporting face of the ornament main body; a magnetic isolation component is arranged between the apertural face of the NFC antenna housing and the supporting face.

8 Claims, 6 Drawing Sheets

(56) References Cited

U.S. PATENT DOCUMENTS

| | | | |
|---|---|---|---|
| 2014/0370917 A1* | 12/2014 | Buchheim | H04W 4/023 |
| | | | 455/456.1 |
| 2015/0075220 A1 | 3/2015 | Dobashi | |
| 2015/0349556 A1* | 12/2015 | Mercando | H02J 7/32 |
| | | | 455/573 |
| 2016/0034742 A1* | 2/2016 | Kim | G06V 40/1365 |
| | | | 382/124 |
| 2016/0104355 A1* | 4/2016 | Alexander | G08B 25/016 |
| | | | 340/693.1 |
| 2016/0196487 A1* | 7/2016 | Huynh | G06K 19/07762 |
| | | | 63/1.11 |
| 2017/0235933 A1* | 8/2017 | von Badinski | G06F 1/1635 |
| | | | 726/19 |
| 2020/0178395 A1* | 6/2020 | Graber | H04B 1/385 |
| 2021/0278898 A1* | 9/2021 | Erivantcev | H04B 5/79 |
| 2021/0289897 A1* | 9/2021 | Hsu | H01Q 1/2291 |
| 2022/0019993 A1* | 1/2022 | Rezayee | G06K 19/0712 |
| 2023/0006338 A1* | 1/2023 | Liu | G04R 60/06 |
| 2023/0008911 A1* | 1/2023 | Rossi | H01Q 1/526 |
| 2023/0043018 A1* | 2/2023 | Wai | A61B 5/1117 |
| 2023/0148716 A1* | 5/2023 | Zhou | A44C 5/0007 |
| | | | 224/217 |
| 2024/0106122 A1* | 3/2024 | Samardzija | H01Q 1/2283 |

FOREIGN PATENT DOCUMENTS

| | | | | |
|---|---|---|---|---|
| CN | 204426923 U | * | 7/2015 | |
| CN | 110501896 A | * | 11/2019 | G04G 17/04 |
| CN | 112998368 A | * | 6/2021 | A44C 9/0053 |
| JP | 2016512671 A | * | 4/2016 | |

OTHER PUBLICATIONS

TimesKey-US; TimesKey NFC Tags Ntag215 NFC Keytags Colorful NFC fob Rewritable NFC 215 Tag NFC Business Card Programmable NFC Tag 504 Bytes Memory , Compatible with Android & iPhone (7 Pieces); Dec. 2, 2017; Amazon.com (Year: 2017).*

* cited by examiner

NFC ORNAMENT

TECHNICAL FIELD

The present disclosure relates to the field of ornaments, specifically to a near-field communication (NFC) ornament.

BACKGROUND

With the development of science and technology and the increasing living needs of people, a variety of intelligent wearable products have appeared on the market, including an intelligent bracelet, a smart watch, an intelligent health monitoring device, an intelligent alarm safety device, an intelligent ornament, and the like. Smart NFC ornaments are especially popular with young people because it exchanges information in a near-distance non-contact way. For example, NFC ornaments are used for exchanging business cards, making payments, or recording some important memorable days or moments. However, most of the NFC ornaments on the market are directly achieved by adding NFC chips to ornaments. Such an NFC ornament usually has the following defects: First, an ornament is usually made of metal. Because metal has a strong electromagnetic shielding effect, electromagnetic signals are easily shielded, which affects signal transmission of NFC. Therefore, in order to avoid the interference of metal on communication signals, an NFC ornament is usually made of nonmetal such as ceramic, which greatly limits the wearability and design sense of the ornament itself, and this ornament cannot be truly integrated with ornaments that people are accustomed to wearing in daily life. Secondly, a few of NFC ornaments are partially provided with metal. NFC chip antennas use conventional sheet antennas. Considering a small size of an ornament itself and a small layout region, metal interference in the process of communication induction causes poor signal sensing caused, and users often cannot determine specific locations of NFC antennas, which leads to low signal sensing sensitivity and poor experience.

SUMMARY

The present disclosure aims to overcome the defects and shortcomings in the prior art, an NFC ornament is provided. The NFC ornament influence of a metal portion of the ornament on an NFC antenna signal by using a magnetic isolation sheet. In addition, a large-area NFC antenna is wound in an antenna slot, so that the NFC ornament is covered with NFC signals around, which greatly improves the communication ability, thereby making it possible that a metal NFC ornament has a good communication experience.

In order to achieve the above objective, the present disclosure provides an ornament. The ornament includes an ornament main body, an NFC chip, an NFC antenna connected with the NFC chip, an NFC antenna housing and a decorating part.

A surface of the ornament main body is provided with an insert hole and a supporting face located at a periphery of the insert opening; a groove is formed in the NFC antenna housing; an apertural face of the NFC antenna housing is connected with a supporting face of the ornament main body; a shape of the apertural face of the NFC antenna housing is the same as that of the supporting face;

A magnetic isolation component is arranged between the apertural face of the NFC antenna housing and the supporting face; a space formed between the magnetic isolation component and the NFC antenna housing is used for accommodating the NFC chip and the NFC antenna; and the decorating part is mounted in the insert hole.

The NFC antenna housing is made of a nonmetal material.

According to one embodiment of the present disclosure, the supporting face of the ornament main body is an annular supporting face; a cylindrical insert pillar is also arranged at a position of the insert hole; the cylindrical insert pillar protrudes from the supporting face; the cylindrical insert pillar is connected with the annular supporting face; the magnetic isolation component comprises an annular magnetic isolation sheet abutting against a surface of the annular supporting face, and a columnar magnetic isolation sheet abutting against a surface of the cylindrical insert pillar; the cylindrical insert pillar is threaded through a center of the NFC antenna housing; and the apertural face of the NFC antenna housing is connected with the annular supporting face.

According to one embodiment of the present disclosure, the NFC antenna is composed of an enameled copper wire which is wound into multiple turns and abuts against an inner wall of the groove.

According to one embodiment of the present disclosure, the enameled copper wire that is wound into multiple and turns uniformly abuts against the inner wall of the groove of the NFC antenna housing in a single-layer manner.

According to one embodiment of the present disclosure, the NFC antenna is wound to the inner wall of the groove of the NFC antenna housing in a two-layer or multilayer manner.

According to one embodiment of the present disclosure, the magnetic isolation component abuts against a surface of the supporting face by using a double-side adhesive tape.

According to one embodiment of the present disclosure, the annular magnetic isolation sheet abuts against a surface of the annular supporting face by using a double-side adhesive tape, and the columnar magnetic isolation sheet abuts against a surface of the cylindrical insert pillar by using a double-side adhesive tape.

According to one embodiment of the present disclosure, the apertural face of the NFC antenna housing is fixed to the supporting face of the ornament main body by using glue.

Compared with the prior art, the present disclosure has the following beneficial effects: the magnetic isolation component is used, which avoids the influence of the metal portion of the ornament on NFC antenna signals. In addition, a large-area NFC antenna is wound in the groove in the NFC antenna housing, so that the NFC ornament is covered with NFC signals around, which greatly improves the communication ability.

DETAILED DESCRIPTION OF THE EMBODIMENTS

The present disclosure is further described in detail below in combination with the embodiments and drawings, but the implementations of the present disclosure are not limited to this.

Figure 1:
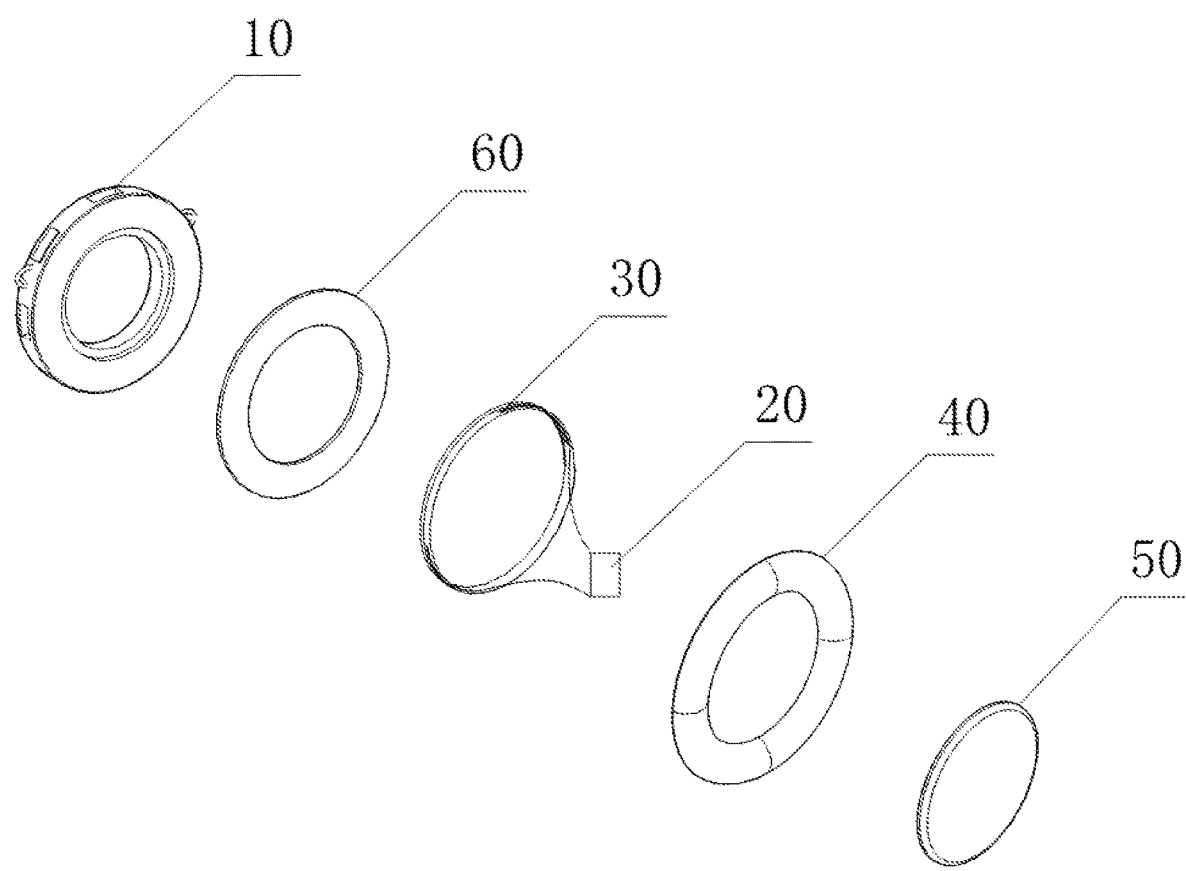
FIG. 1 is a schematic structural diagram of an NFC ornament of the present disclosure.

FIG. 1 shows an ornament of the present disclosure. The ornament includes an ornament main body 10, an NFC chip 20, an NFC antenna 30 connected with the NFC chip 20, an NFC antenna housing 40 and a decorating part 50.

Figure 2:
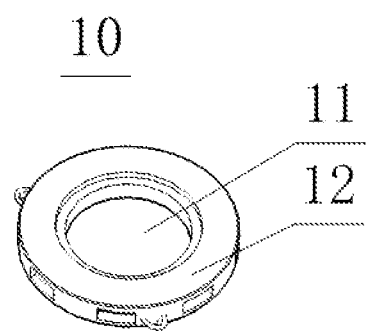
FIG. 2 is a schematic diagram of an ornament main body of the present disclosure.
Figure 3:
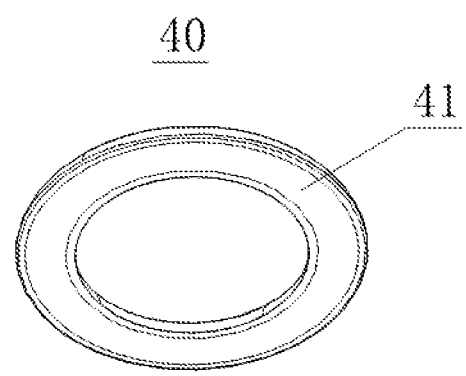
FIG. 3 is a schematic sectional diagram of an NFC antenna housing of the present disclosure.

As shown in FIG. 2, a surface of the ornament main body 10 is provided with an insert hole 11 and a supporting face 12 located at a periphery of the insert opening 11. As shown in FIG. 3, a groove 41 is formed in the NFC antenna housing 40. An apertural face of the NFC antenna housing 40 is connected with the supporting face 12 of the ornament main body 10. The apertural face of the NFC antenna housing 40 is usually fixed to the supporting face 12 of the ornament main body 10 by using glue. In addition, in order to better glue the apertural face and the supporting face, a shape of the apertural face of the NFC antenna housing 40 is the same as that of the supporting face 12. In this embodiment of the present disclosure, in order to not block the decorating part 50 mounted at the insert hole 11, the NFC antenna housing 40 is designed into a hollow ring, and the groove 41 is formed in the ring.

The NFC ornament main body 10 is usually made of metal. In order to avoid communication signals from being affected by a metal shell, as shown in FIG. 1, the present disclosure uses a magnetic isolation component 60 to isolate an NFC signal from the metal ornament main body 10. The magnetic isolation component 60 is arranged between the apertural face of the NFC antenna housing 40 and the supporting face 12. The magnetic isolation component 60 usually abuts against a surface of the supporting face 12 by using a double-side adhesive tape. A space formed between the magnetic isolation component 60 and the NFC antenna housing 40 is used for accommodating the NFC chip 20 and the NFC antenna 30. The NFC antenna housing 40 is made of a nonmetal material, preferably a polycarbonate (PC) material or a resin material.

In this embodiment of the present disclosure, the ornament includes a bracelet, a necklace, or other pendants. The ornament main body 10 is a main body of a pendant, as long as a chain or a rope is connected outside the ornament main body 10 of the bracelet or necklace.

Figure 4:
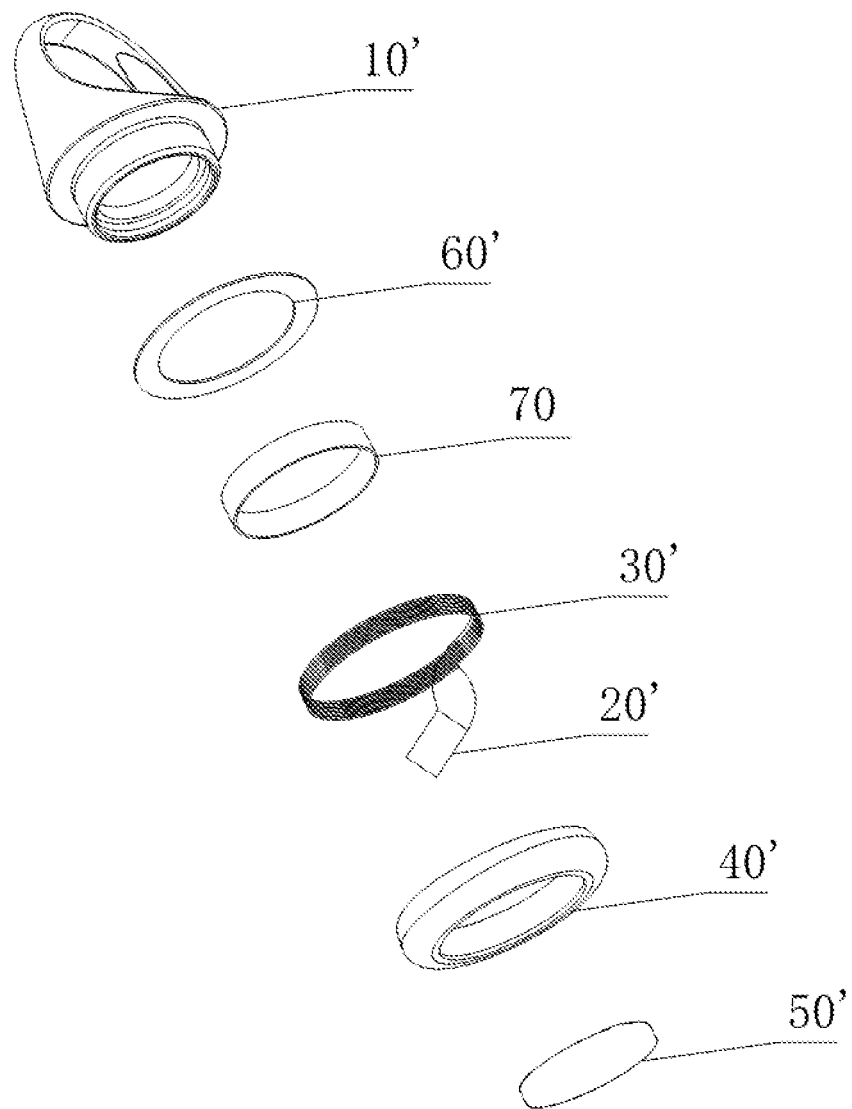
FIG. 4 is a schematic diagram according to an embodiment of the present disclosure.
Figure 5:
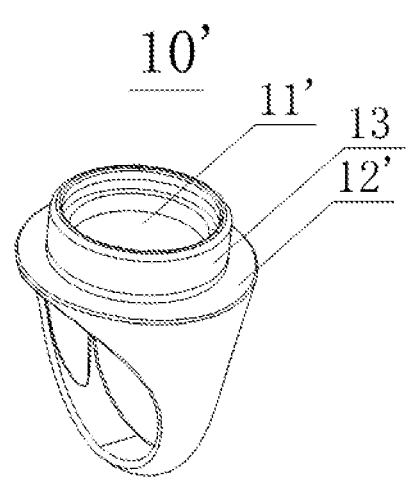
FIG. 5 is a schematic diagram according to an embodiment of the present disclosure.

Of course, the ornament of the present disclosure may also be a smart NFC finger ring type ornament. A smart NFC finger ring is used as another embodiment to describe the technical solutions of the present disclosure below. As shown in FIG. 4, the finger ring ornament includes a ornament main body 10', an NFC chip 20', an NFC antenna 30' connected with the NFC chip 20', an NFC antenna housing 40' and a decorating part 50'. As shown in FIG. 5, a surface of the ornament main body 10' is provided with an insert hole 11' and a supporting face located at a periphery of the insert opening 11'. In this embodiment of the present disclosure, the supporting face of the ornament main body 10' is an annular supporting face 12'. A cylindrical insert pillar 13 is also arranged at a position of the insert hole 11'. The cylindrical insert pillar 13 protrudes from the supporting face 12'. The cylindrical insert pillar 13 is connected with the annular supporting face 12'. Of course, in this embodiment of the present disclosure, the cylindrical insert pillar 13 and the annular supporting face 12' may be integrally manufactured. The finger ring ornament further includes an annular magnetic isolation sheet 60' abutting against a surface of the annular supporting face 12', and a columnar magnetic isolation sheet 70 abutting against a surface of the cylindrical insert pillar 13. The cylindrical insert pillar 13 is threaded through a center of the NFC antenna housing 40', and an apertural face of the NFC antenna housing 40' is connected with the annular supporting face 12'.

In this embodiment of the present disclosure, if the NFC ornament uses another insert shape instead of the cylindrical insert pillar 13, a shape of a surface of an outer wall of the insert shape and a shape of the supporting face will change. Correspondingly, shapes of the magnetic isolation sheets abutting against the surface of the outer wall of the insert shape and the supporting face will also change. Of course, the magnetic isolation sheets can also integrally abut against the above two surfaces. In this embodiment of the present disclosure, an abutting manner using glue can be applied to both the annular magnetic isolation sheet and the columnar magnetic isolation sheet. In the present disclosure, an abutting manner using a double-side adhesive tape is preferred.

Figure 6:
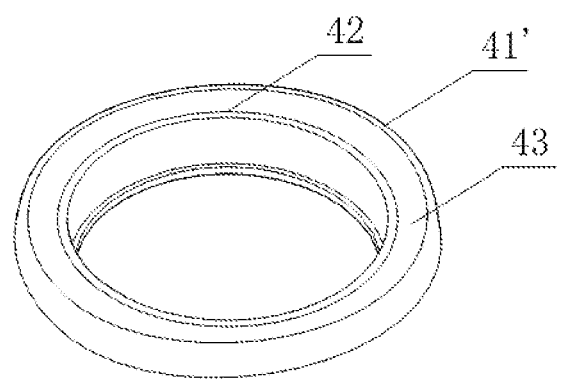
FIG. 6 is a schematic diagram according to an embodiment of the present disclosure.

As shown in FIG. 6, the NFC antenna housing 40' includes an inner antenna housing wall 42, an outer antenna housing wall 43, and an antenna slot 41' formed by a space between the inner antenna housing wall 42 and the outer antenna housing wall 43 and used for accommodating the NFC antenna 30'. The inner antenna housing wall 42 is sleeved to an outer surface of the cylindrical insert pillar 13 with the columnar magnetic isolation sheet 70. The NFC antenna housing 40' is fixedly mounted on the annular supporting plane 12' of the ornament main body 10'. The decorating part 50' is mounted in the cylindrical insert pillar 13. In order to avoid signals of the NFC antenna 30' from being shielded, the NFC antenna housing 40' is also made of a nonmetal material.

The NFC antenna of a pendant or finger ring type ornament or other smart NFC ornaments is composed of an enameled copper wire which is wound into multiple turns and abuts against an inner wall of the groove 41 or the antenna slot 41'. In order to make a signal range wider, in this embodiment of this present disclosure, the enameled copper wire wound into multiple turns uniformly abuts against the inner wall of the groove 41 or antenna slot 41' of the NFC antenna housing in a single-layer manner. It is verified via multiple tests that a signal in this single-layer winding manner is greatly enhanced compared with an existing NFC antenna. In addition, the NFC antenna can also abut against the inner wall of the groove 41 or antenna groove 41' of the NFC antenna housing in a two-layer or multilayer manner. These manners can also greatly enhance an NFC signal, and the NFC ornament can be covered with enough NFC signals. The signal sensitivity in a use process is obviously improved.

To sum up, according to the NFC ornament of the present disclosure, the influence of the metal portion of the ornament on NFC antenna signals is avoided by using the magnetic isolation component. In addition, a large-area NFC antenna is wound in the groove of the NFC antenna housing, so that the NFC ornament is covered with NFC signals around, which greatly improves the communication ability and really realizes fusion of the metal-based ornament industry and NFC, making it possible that an NFC ornament meets wearing demands and experience demands of more users.

The above-mentioned embodiments are preferred implementation modes of the present disclosure, but the implementation modes of the present disclosure are not limited by the above-mentioned embodiments, and any other changes, modifications, substitutions, combinations, and simplifications that are made without departing from the spirit and principle of the present disclosure shall all be equivalent replacement methods, which all fall within the protection scope of the present disclosure.

What is claimed is:

1. A near-field communication (NFC) ornament, comprising an ornament main body, an NFC chip, an NFC antenna connected with the NFC chip, an NFC antenna housing and a decorating part, wherein
   a surface of the ornament main body is provided with an insert hole and a supporting face located at a periphery of the insert opening; a groove is formed in the NFC antenna housing; an apertural face of the NFC antenna housing is connected with a supporting face of the ornament main body; a shape of the apertural face of the NFC antenna housing is the same as that of the supporting face;
   a magnetic isolation component is arranged between the apertural face of the NFC antenna housing and the supporting face; a space formed between the magnetic isolation component and the NFC antenna housing is used for accommodating the NFC chip and the NFC antenna; the decorating part is mounted in the insert hole; and
   the NFC antenna housing is made of a nonmetal material.

2. The NFC ornament according to claim 1, wherein the supporting face of the ornament main body is an annular supporting face; a cylindrical insert pillar is also arranged at a position of the insert hole; the cylindrical insert pillar protrudes from the supporting face; the cylindrical insert pillar is connected with the annular supporting face; the magnetic isolation component comprises an annular magnetic isolation sheet abutting against a surface of the annular supporting face, and a columnar magnetic isolation sheet abutting against a surface of the cylindrical insert pillar; the cylindrical insert pillar is threaded through a center of the NFC antenna housing; and the apertural face of the NFC antenna housing is connected with the annular supporting face.

3. The NFC ornament according to claim 2, wherein the NFC antenna is composed of an enameled copper wire which is wound into multiple turns and abuts against an inner wall of the groove.

4. The NFC ornament according to claim 3, wherein the enameled copper wire that is wound into multiple turns and uniformly abuts against the inner wall of the groove of the NFC antenna housing in a single-layer manner.

5. The NFC ornament according to claim 3, wherein the NFC antenna is wound to the inner wall of the groove of the NFC antenna housing in a two-layer or multilayer manner.

6. The NFC ornament according to claim 1, wherein the magnetic isolation component abuts against a surface of the supporting face by using a double-side adhesive tape.

7. The NFC ornament according to claim 2, wherein the annular magnetic isolation sheet abuts against a surface of the annular supporting face by using a double-side adhesive tape, and the columnar magnetic isolation sheet abuts against a surface of the cylindrical insert pillar by using a double-side adhesive tape.

8. The NFC ornament according to claim 1, wherein the apertural face of the NFC antenna housing is fixed to the supporting face of the ornament main body by using glue.

* * * * *